(12) United States Patent
Halford

(10) Patent No.: US 9,889,581 B2
(45) Date of Patent: Feb. 13, 2018

(54) TOOL TEMPERATURE CONTROL

(71) Applicant: SURFACE GENERATION LIMITED, Rutland (GB)

(72) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 690 days.

(21) Appl. No.: 14/357,333

(22) PCT Filed: Nov. 8, 2012

(86) PCT No.: PCT/GB2012/052776
§ 371 (c)(1),
(2) Date: May 9, 2014

(87) PCT Pub. No.: WO2013/068749
PCT Pub. Date: May 16, 2013

(65) Prior Publication Data
US 2014/0306377 A1 Oct. 16, 2014

(30) Foreign Application Priority Data
Nov. 10, 2011 (GB) .................................. 1119425.5

(51) Int. Cl.
*B29C 35/04* (2006.01)
*B29C 33/04* (2006.01)
*B29C 35/00* (2006.01)

(52) U.S. Cl.
CPC .......... *B29C 35/045* (2013.01); *B29C 33/046* (2013.01); *B29C 35/00* (2013.01); *B29C 2035/046* (2013.01)

(58) Field of Classification Search
None
See application file for complete search history.

(56) References Cited

U.S. PATENT DOCUMENTS

| | | | |
|---|---|---|---|
| 2,493,439 A | 1/1950 | Brauntl | |
| 2,689,372 A | 9/1954 | Goulding, Jr. et al. | |
| 3,043,017 A | 7/1962 | Strickland | |
| 4,621,995 A * | 11/1986 | Wersosky | B29C 33/046 137/625.33 |
| 4,890,995 A * | 1/1990 | Gray | B29C 33/046 264/301 |
| 5,106,285 A | 4/1992 | Preston | |
| 5,445,510 A | 8/1995 | Jackson, Jr. | |

FOREIGN PATENT DOCUMENTS

| | | |
|---|---|---|
| EP | 0186285 A1 | 7/1986 |
| JP | 11090969 A | 6/1999 |

OTHER PUBLICATIONS

Patent Act 1977: Search Report under Section 17(6) in related application GB11194255, dated Jul. 18, 2012.
Patent Act 1977: Search Report under Section 17(6) in related application GB1119425.5, dated Mar. 8, 2012.

* cited by examiner

*Primary Examiner* — Benjamin A Schiffman
(74) *Attorney, Agent, or Firm* — Young Law Firm, P.C.

(57) ABSTRACT

A tool element assembly (10) is provided in which ambient air is drawn into a fluid chamber (24) and heated via a heating element (28) in order to provide a low pressure, efficient, heating system.

13 Claims, 4 Drawing Sheets

TOOL TEMPERATURE CONTROL

CROSS-REFERENCE TO RELATED APPLICATIONS

This application is a 35 U.S.C. § 371 US National Phase application of International Patent Application PCT/GB2012/052776 having an International Filing Date of Nov. 8, 2012, which claims priority to GB application GB1119425.5 filed on Nov. 10, 2011, which applications are incorporated herein by reference in their entireties and from which priority is hereby claimed under 35 U.S.C. § 120.

BACKGROUND

The present invention is concerned with a tool element. More specifically, the present invention is concerned with a moulding tool or an element for a moulding tool having temperature control for moulding large, slow-to-cure workpieces.

As discussed in the applicant's prior published international patent application, WO2011/048365, it is known to provide a tool having a plurality of zones which are independently controlled in order to achieve the desired properties of the resulting moulded workpiece.

Known mould tools having temperature control are required to be dynamic—that is to increase and decrease the temperature of the tool as quickly as possible to respond to the tool control system (which may monitor the properties of the workpiece material). Being dynamic means that the tools can more accurately control the curing process.

Such systems require a source of pressurised fluid either from a pressurised tank or a compressor. Provision of a pressurised fluid allows an increased amount of energy to be transferred to and from the tool (depending on whether the user is heating or cooling the tool surface). In addition, the increased fluid velocity that compressed or pressurised cooling air provides increases the heat transfer coefficient between the fluid and the tool control surface. In certain applications, responsiveness is not a key factor in moulding. For example, when large thick structures such as wind turbine blades are moulded, curing occurs over a long period of time and is generally predictable. Tools for moulding articles of this nature do not need to be dynamic as the overall curing time is far longer than the heating or cooling time. Under these circumstances, efficiency is more important.

A further problem with the prior art is that compressed air lines need to be router throughout the mould tool. This is costly and complex. It is an object of the present invention to provide a tool element temperature control system which is better suited to large, slow curing workpieces.

BRIEF DESCRIPTION OF THE DRAWINGS

An example tool element assembly in accordance with the present invention will now be described with reference to the accompanying figures in which:—

FIG. 1b is a side section schematic view of the tool element assembly of FIG. 1a.

DETAILED DESCRIPTION

Figure 1A:
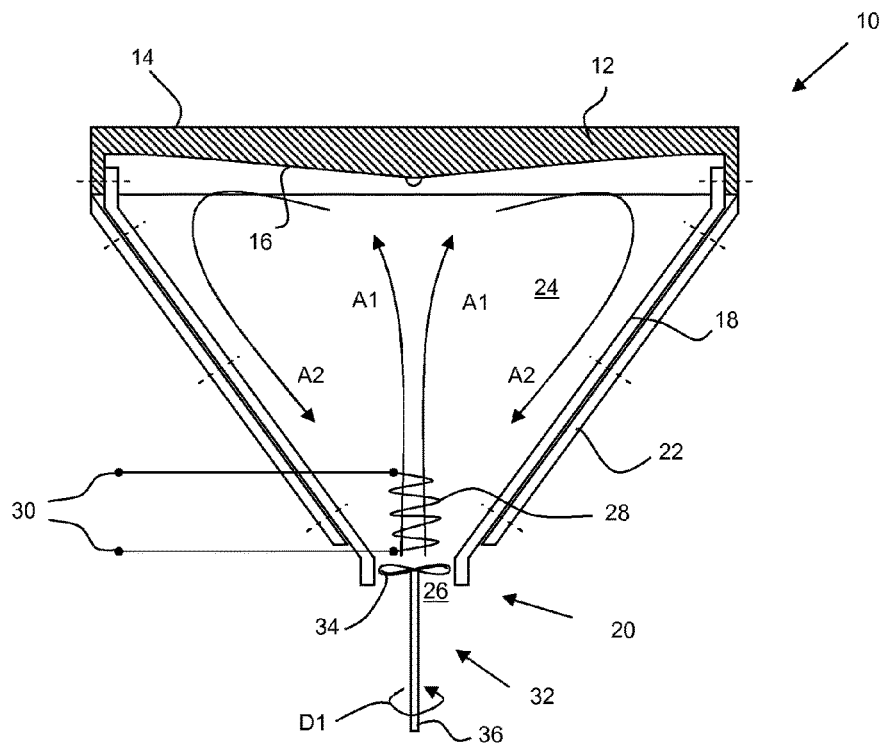
FIG. 1a is a side section schematic view of a first tool element assembly in accordance with the present invention.

According to a first aspect of the present invention, there is provided a tool element assembly comprising a tool element having a tool surface, and a control surface opposite the tool surface, a thermal control structure defining a fluid chamber partially bounded by the control surface, the thermal control structure having a fluid inlet and a fluid heater, in which the fluid inlet is open to atmosphere in use to admit ambient pressure air into the fluid chamber to be selectively heated by the fluid heater.

By using ambient pressure air, a slower increase and decrease in temperature results (depending on whether used as heating or cooling) and, as such, the system is made less dynamic. Efficiency is increased as a result, because of the lack of air compression. Because the air within the chamber is near atmospheric pressure, the pressure difference between the inside and outside of the chamber is not significant, and therefore less warm gas is exhausted (reducing the energy loss, and the need to route excess exhaust gas away for safety reasons).

The fluid chamber tends to hold a set volume of air at a fixed temperature. As thermal energy is conducted to the mould tool, more energy is gradually added via the heating element. The fluid chamber is thermostatically controlled in order to provide a consistent temperature across the tool element. This means that less energy is used in heating any pressurised air fed into the chamber, as with the prior art. Preferably, the air heater is positioned proximate the fluid inlet and inside the fluid chamber. More preferably, the inlet may be positioned below the control surface in use such that the fluid heated by the air heater is thermally convected to the control surface. Under these circumstances, a compressed air source or indeed any kind of fluid pump is not required as the more buoyant hot air will rise towards the control surface (the air "self-pumps"). As heat is transferred to the tool, the cool layer proximate the surface will then fall to be reheated by the heating element. In this way a convection cell is build up within the fluid chamber. Optionally, an air pump may be positioned proximate the inlet. This pump may draw ambient air into the chamber thus increasing the pressure and velocity of the air therein. This helps to provide an increased level of heating to the control surface should it be required.

The air pump may be reversible to exhaust air from the outlet to the fluid chamber, for example if cooling is required.

According to a second aspect of the invention there is provided a tool element assembly comprising:

a tool element having a tool surface, and a control surface opposite the tool surface, a thermal control structure defining a fluid chamber partially bounded by the control surface, the thermal control structure having a fluid heater having an inlet region, a heating region and an outlet region, in which the fluid heater is positioned within the fluid chamber to form a convection cell such that fluid:
  enters the fluid heater at the inlet region,
  is heated at the heating region,
  is convected to the control surface from the outlet region, and,
  is recirculated to the inlet region from the control surface.

Advantageously, providing recirculation using fluid convection makes the system inherently more efficient. Although this generally decreases response time, this type of system is ideal for large, slow to cure workpieces as discussed above.

Preferably the fluid chamber comprises a fluid inlet open to atmosphere in use to admit ambient pressure air into the fluid chamber to be selectively heated by the fluid heater.

The inlet may be below the control surface in use such that fluid heated by the fluid heater is thermally convected to the control surface. An air pump may be provided proximate the fluid chamber in order to encourage recirculation within the convection cell, which air pump may be arranged to entrain ambient pressure air into the fluid chamber to increase chamber pressure if required. Preferably, the air pump is reversible to exhaust air from the fluid chamber, such that the fluid inlet can become a fluid outlet.

The air heater may be positioned between the inlet and the pump, which means the pump (which may be a fan) draws air through the heater.

Preferably, the fluid chamber tapers outwardly towards the control surface. This not only means that a small inlet can be used to serve a large surface area, but it also means that the outward tapering prevents the side of adjacent fluid chambers from contacting each other and influencing each others temperature. It also means that thermal energy is easily conducted from the chamber walls, which is advantageous should the tool be in the cooling cycle.

According to a third aspect of the invention there is provided a method of manufacturing a moulded workpiece comprising the steps of:
  providing a tool element having a tool surface and a control surface opposite the tool surface,
  providing a thermal control structure defining a fluid chamber partially bounded by the control surface, the thermal control structure having a fluid inlet open to ambient air,
  providing a fluid heater, and,
  heating the control surface by drawing ambient air into the fluid chamber and heating the ambient air with the air heater.

The method of manufacturing according to the third aspect may include the steps of: providing an air pump proximate the fluid chamber, and,
  pumping ambient air into the chamber. According to a fourth aspect of the invention there is provided a method of manufacturing a moulded workpiece comprising the steps of:
  providing a tool element having a tool surface and a control surface opposite the tool surface,
  providing a thermal control structure defining a fluid chamber partially bounded by the control surface,
  providing a fluid heater, and,
  establishing, a convection cell within the fluid chamber to heat air with the fluid heater, convect the heated air to the control surface, and return the convected air to the heater for re-heating.

The method of manufacturing according to the fourth aspect may include the steps of: providing an air pump proximate the fluid chamber, and,
  driving the convection cell with the pump.

Figure 1B:
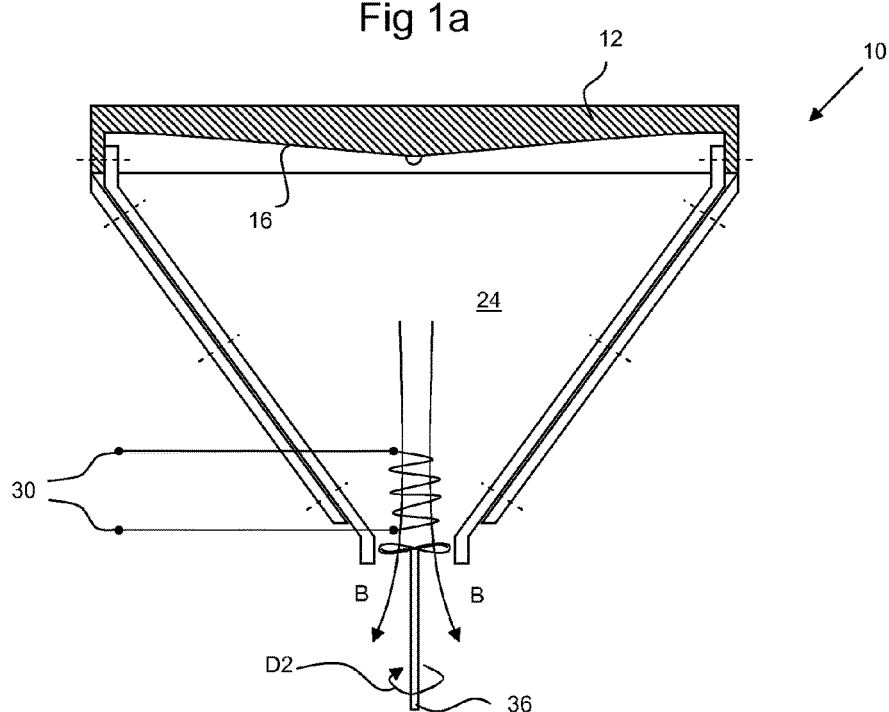

Turning to FIGS. 1a and 1b, there is provided a tool element assembly 10 comprising a tool element 12 defining a tool surface 14 on a first side thereof, and a control surface 16 on a second side thereof. The tool surface 14 is shaped to the profile of the workpiece (not shown). The tool element 12 is square in profile so as to be tessellated with similar elements. A support beam 18 extends from the centre of each side of the tool element 12, the beams extending towards an inlet region 20. A side panel 22 is connected to each of the support beams 18 such as to form a fluid chamber 24, bordered at its top surface by the control surface 16. The side panels 22 converge at the inlet region 20 in order to form an inlet orifice 26.

A heating element 28 is provided, above the inlet orifice 26 within the fluid chamber 24. The heating element 28 is powered by an electricity supply 30 which is selectively controlled by a thermal control system.

Within the inlet orifice 26 an air pump 32 is provided having an impeller 34 driven by a shaft 36. The impeller 34 is configured to draw air into the fluid chamber 24 when rotated in a first direction as shown by arrow D1. In use, a plurality of the tool elements 12 are tessellated to form a continuous tool surface. In order to heat the control surface 16 and therefore the tool surface 14 and the workpiece the element 28 is powered by the electricity supply 30. The impeller 34 is driven by the shaft 36 in direction D1 in order to draw ambient air surrounding the tool element assembly 10 into the chamber 24 past the heating element 28. The heated air, as shown by arrows A1, is driven towards the control surface 16 and impinges thereon, thereby heating it. As the air cools, and is pushed radially outwardly by the incoming air, it falls back towards the element 28 along arrows A2 where it is heated and rises again. In this manner, a convection cell is formed which may require little input from the pump 32 because the heated air will naturally rise.

Turning to FIG. 1b, if the user wishes to cool the element 12, then the shaft 36 can be rotated in the opposite direction D2. At the same time, the electricity supply 30 is interrupted such that the heating element 28 does not heat the air. Under these circumstances, the air is drawn in the direction of arrows B out of the chamber 24. Naturally, ambient air will also be drawn into the chamber due to a negative pressure and this circulation of ambient temperature air against the control surface 16 will act to cool down the tool element 12.

An alternative arrangement is shown in FIG. 2 in which similar components have reference numerals 100 greater.

The tool element assembly 110 is identical to the tool element 10 with the exception that no fluid pump 32 is provided. Should the user wish to heat the tool element 112, then the electricity supply 130 is activated such that the heating element 128 heats the immediately surrounding air within the inlet orifice 126 to the extent that its buoyancy raises it towards the control surface 116 of the element 112. As the air rises in the direction of arrow C, it transfers some of its thermal energy to the cooler control surface 116. As the air cools and further hot air rises in the direction of arrows C, the cooling air will pass back down the sides of the side panels 122 to be reheated as it contacts the heating element 128. In this manner a convection cell is established within the fluid chamber 124 to heat the tool element 112. It will be noted that in order to cool the tool element, the heating element 128 is simply deactivated. Under these circumstances, cooling may take longer than the embodiment of FIGS. 1a and 1b as the air will may tend to sit within the chamber 124 and cool by conduction through the chamber walls. For this reason, it is envisaged that the chamber walls may be constructed from a thin plate material, such as mica, preferably less than 5 mm thick, more preferably 1 mm thick.

Figure 2A:
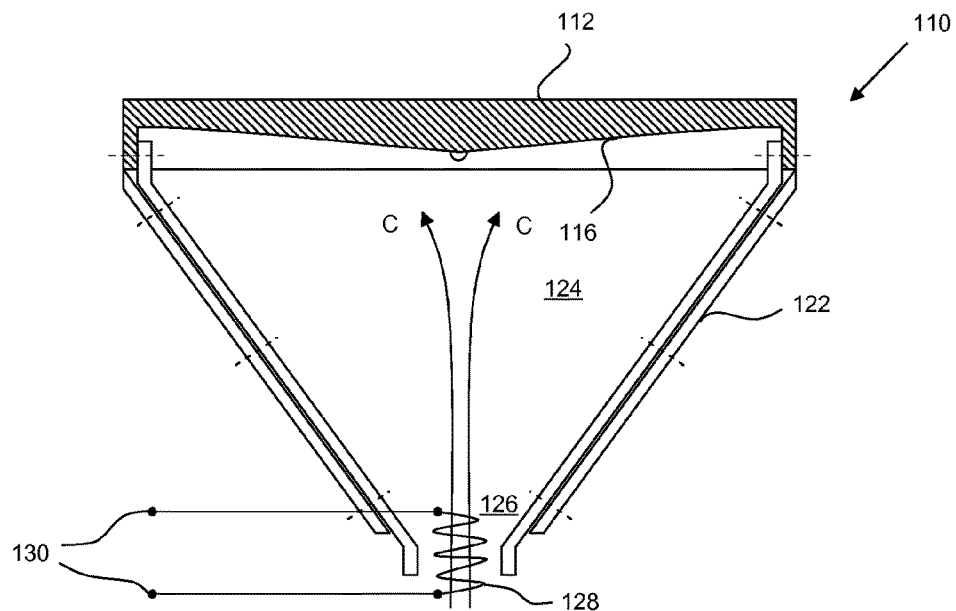
FIG. 2a is a side section schematic view of a second tool element assembly in accordance with the present invention.
Figure 2B:
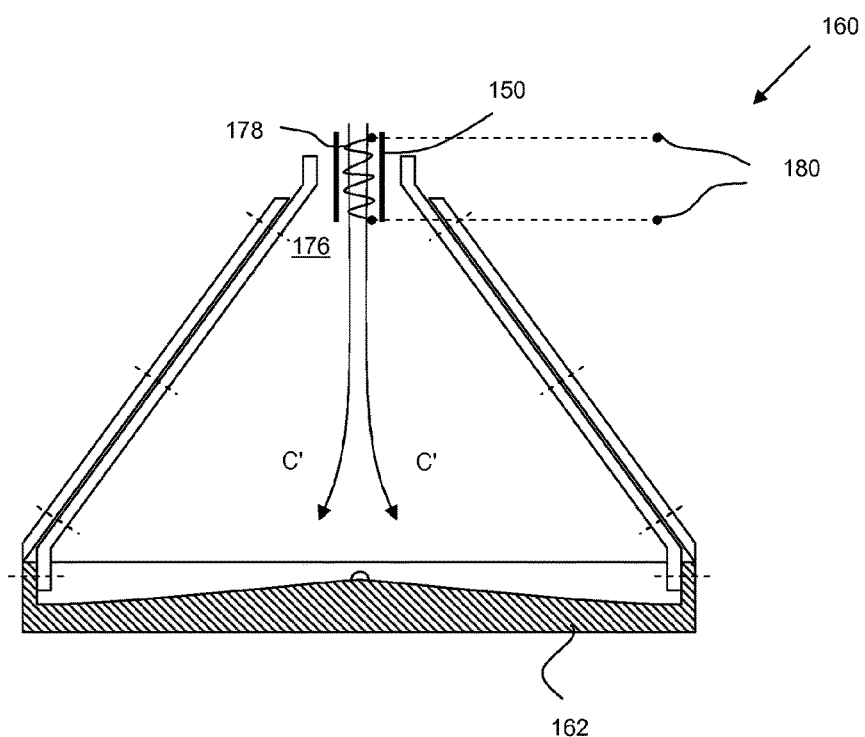
FIG. 2b is a side section schematic view of a third tool element assembly in accordance with the present invention.

An embodiment similar to that of FIG. 2a is shown in FIG. 2b, and in intended for use on the same tool, only to heat the upper tool part (and therefore heat the upper horizontal surface). Like components with FIG. 2a are numbered 50 greater.

A tool element assembly 160 is provided, similar to the tool element 110 but inverted. Should the user wish to heat the tool element 162, then the electricity supply 180 is activated such that the heating element 178 heats the immediately surrounding air. A difference to the tool element assembly 110 is that the tool element assembly 160 comprises a heater shroud 150. The heater shroud 150 defines a conduit around the heating element 178. As the air within the shroud is heated, it expands and is pushed from the ends of the shroud 150 in both upward and downward directions. The momentum of the downward travelling air (towards the tool element 162 in direction C) allows the air to travel to it and consequently heat it When cooling of the tool element 162 is desired, the heater 178 is deactivated. As heat is conducted from the tool element 162 to the adjacent air, the air then rises and escapes through the orifice 176. In variations of the embodiment of FIG. 2b, the shroud may be shaped to encourage downward propagation of the warm air, for example by providing a constriction. Alternatively, or in addition, the heater element 178 may be pulsed to set up a resonant effect within the shroud to assist the propagation of the hot air towards the tool element.

Figure 3:
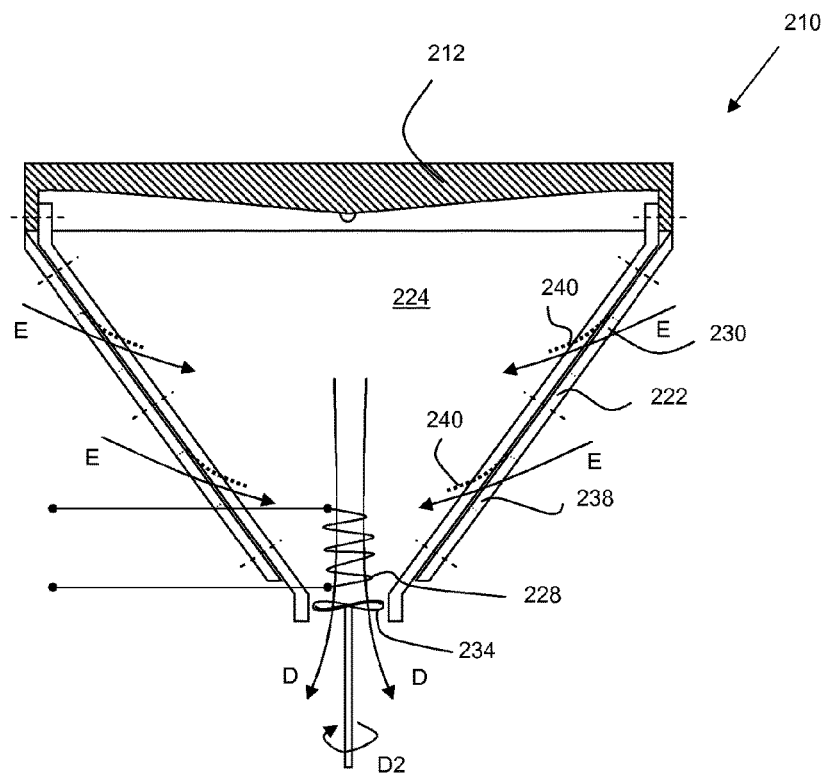
FIG. 3 is a side section schematic view of a fourth tool element assembly in accordance with the present invention.

A further embodiment is shown in FIG. 3 and like components are numbered 200 greater than the embodiment of FIGS. 1a and 1b. A tool element assembly 210 is provided having the same components as the tool element assembly 10, however, in addition a number of orifices 238 are provided in the wall of each side panel 222. A flap valve 240 is positioned over each of these orifices.

As shown in FIG. 3, the assembly 210 is in the cooling cycle such that the impeller 234 is being rotated in direction D2 to draw air in direction D out of the fluid chamber 224. Under these circumstances, the flap valves 240 open such that cool air can be drawn in the direction of arrows E into the chamber 224 thus providing a cool air stream in order to cool the tool element 212.

It will be noted that should the impeller 234 be reversed in order to draw air into the chamber 224 (and heat it via the element 228), then the slight positive pressure will close the flap valves 240 such that the hot air cannot escape.

Figure 4:
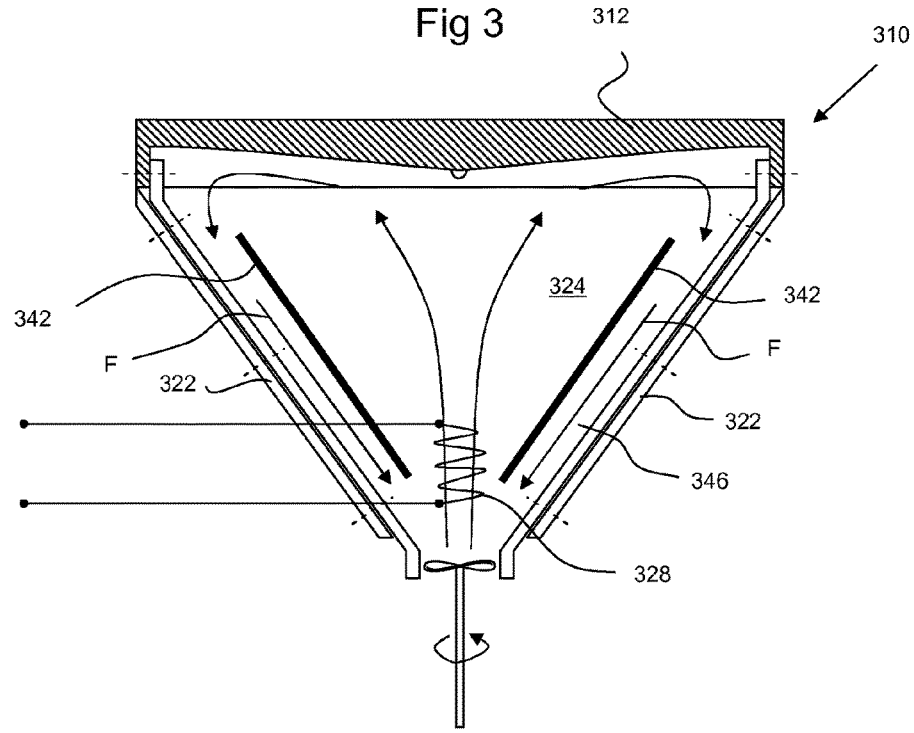
FIG. 4 is a side section schematic view of a fifth schematic view of a fourth tool element assembly in accordance with the present invention.

Turning to FIG. 4, an assembly 310 is shown having reference numerals 200 greater than the assembly 10. The assembly 310 is identical to the assembly 10 with the exception that a series of flat plate-like baffles 342 are provided parallel to and offset from side panels 322. The baffles 342 are oriented such that an air channel 346 is formed between the centre of the fluid chamber 324 and the side panels 322 in order that exhaust air is passed in direction F back down towards the heater 328. The precise construction of the baffles is considered to be within the remit of the notional skilled addressee.

Figure 5:
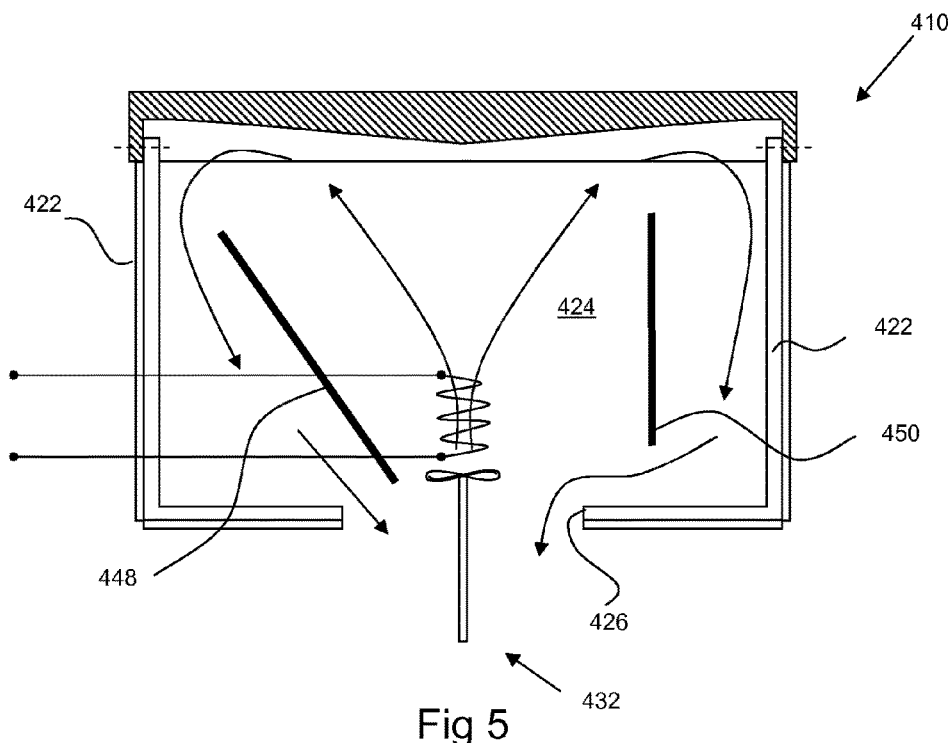
FIG. 5 is a side section schematic view of a sixth tool element assembly in accordance with the present invention; and, FIG. 6 is a side section schematic view of a seventh tool element assembly in accordance with the present invention
Figure 6:
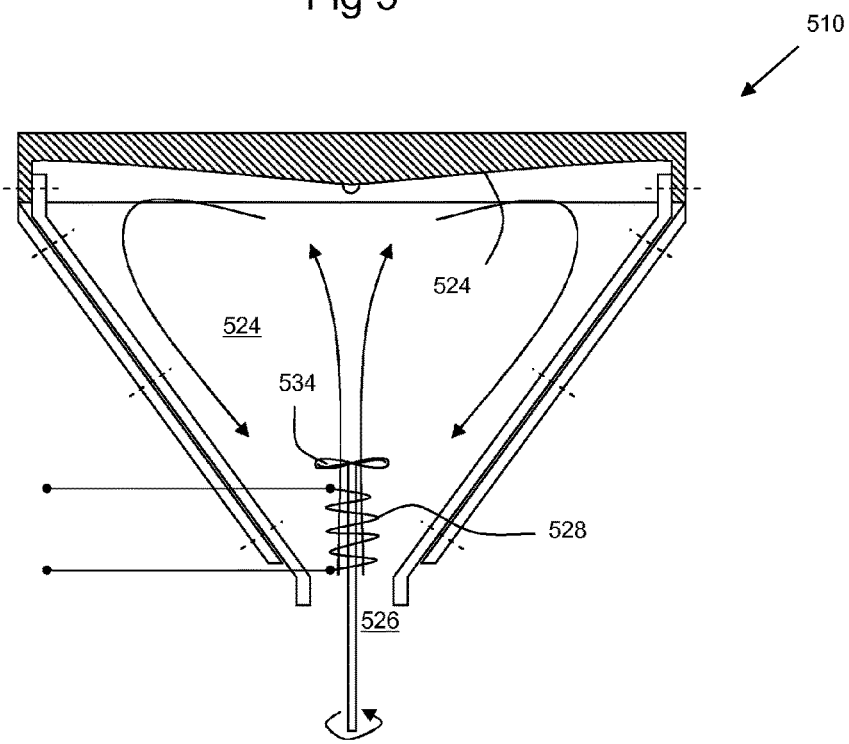

Turning to FIG. 5, the assembly 410 is an example of an assembly similar to 310 having reference numerals of like components 100 greater. In this shown, the side panels 322 form a square or cubic fluid chamber 424. On the left hand side of the assembly 410, a baffle 448 is diagonal and directed towards the inlet orifice 426 below the pump 432. On the right hand side of the assembly 410, a straight baffle 450 is shown by comparison. Turning to FIG. 6, the assembly 510 is similar to the assembly 10 (with reference numerals 500 greater) with the exception that the impeller 534 is positioned between the heater 528 and the control surface 516, within the chamber 524. Advantageously, this arrangement tends to recirculate the air within the chamber 524 rather than drawing in new air through the inlet 526. This makes the system more efficient.

In each of the above examples, a thermocouple or similar temperature sensing arrangement may be provided within the tool element, or the workpiece, to monitor temperature. In addition, it is envisaged that a thermocouple or temperature sensing means would be provided within the fluid chamber such that the temperature of the fluid therein can be measured.

A control system is provided which can control both the air pump (if provided) and the heater element such that the correct temperature at the tool element 12 can be maintained. This control system will also be programmed to take the tool element assembly through a work cycle depending on the required properties of the workpiece and other such factors, such as ambient air temperature and pressure and the curing rate of the workpiece material.

The invention claimed is:

1. A tool element assembly comprising:
   a tool element comprising a tool surface, and a control surface opposite the tool surface;
   a thermal control structure comprising at least one side panel and defining a fluid chamber that is partially bounded by the control surface, the thermal control structure comprising:
      a fluid heater having an inlet region and a heating region; and
      baffles disposed within the fluid chamber and spaced apart from the at least one side panel;
      wherein the fluid heater and baffles are positioned within the fluid chamber to form a convection cell such that fluid:
         enters the fluid heater at the inlet region,
         is heated at the heating region,
         is convected to the control surface in a first fluid channel that is disposed between the baffles, and
         is recirculated from the control surface back to the inlet region in a second fluid channel that is defined between the at least one side panel and the baffles.

2. A tool element assembly according to claim 1, wherein the fluid chamber comprises a fluid inlet open to atmosphere in use to admit ambient pressure air into the fluid chamber to be selectively heated by the fluid heater.

3. A tool element assembly according to claim 2, oriented such that the inlet is below the control surface in use such that fluid heated by the fluid heater is thermally convected to the control surface.

4. A tool assembly according to claim 1, further comprising an air pump proximate the fluid chamber.

5. A tool assembly according to claim 4, wherein the air pump is configured to entrain ambient pressure air into the fluid chamber.

6. A tool assembly according to claim 4, wherein the air pump is configured to drive fluid recirculation within the fluid chamber.

7. A tool assembly according to claim 4, wherein the air pump is reversible to exhaust air from the fluid chamber, such that the inlet region becomes an outlet region.

8. A tool assembly according to claim 4, wherein the air heater is positioned between the inlet and the pump.

9. A tool assembly according to claim 1, wherein the fluid chamber tapers outwardly towards the control surface.

10. A tool assembly according to claim 9, wherein the fluid chamber is constructed from plates.

11. A tool comprising a plurality of tool elements according to claim 1, wherein the respective tool surfaces tessellate to form a tool surface.

12. A method of manufacturing a moulded workpiece, comprising the steps of:
   providing a tool element comprising a tool surface and a control surface that is disposed opposite the tool surface;
   providing a thermal control structure comprising at least one side panel and defining a fluid chamber that is partially bounded by the control surface, the thermal control structure comprising:
      a fluid heater having an inlet region and a heating region; and
      baffles disposed within the fluid chamber and spaced apart from the at least one side panel;
   establishing the convection cell within the fluid chamber to:
      heat air with the fluid heater;
      convect the heated air from the inlet region to the control surface in a first fluid channel that is disposed between the baffles; and
      recirculate the convected air from the control surface back to the inlet region in a second fluid channel that is disposed between the at least one side panel and the baffles.

13. A method of manufacturing a moulded workpiece according to claim 12, further comprising:
   providing an air pump proximate the fluid chamber, driving the convection cell with the pump.

* * * * *